UNITED STATES PATENT OFFICE.

ARTHUR L. RICE, OF ADAMS, NEW YORK; CAROLINE S. RICE EXECUTRIX OF SAID ARTHUR L. RICE, DECEASED.

WATER PAINT.

1,423,256.  Specification of Letters Patent.  Patented July 18, 1922.

No Drawing.  Application filed March 12, 1919. Serial No. 282,151.

*To all whom it may concern:*

Be it known that I, ARTHUR L. RICE, a citizen of the United States, residing at Adams, in the county of Jefferson and State of New York, have invented a new and useful Water Paint, of which the following is a specification.

This invention has reference to water paints, that is, paints in which dry materials are mixed with water as a vehicle to the proper consistency for spreading with a brush. The object of the invention is to provide a water paint of waterproof qualities, whereby the paint may be used on exterior surfaces exposed to rain and dampness without liability of the paint washing off or absorbing moisture, and which may be used on interior surfaces and successfully withstand washing.

In accordance with the invention, the water paint comprises an albuminous material serving as an adhesive, such material comprising finely ground casein, or milk curd, or glue, to which is added hydrated lime, and a base material or filler such as calcium carbonate, talc, clay, silica, barytes or gypsum, or a combination of any two or more of such materials. Furthermore, any desired color may be added.

The amount of the different materials may vary in accordance with circumstances. For instance, to fifteen pounds of casein or glue there may be added ten pounds of hydrated lime and seventy-five pounds of the chosen filler, with sufficient coloring for the purpose desired. The particular proportions given are those which produce good results but it is to be understood that such proportions may be varied more or less.

The ingredients are thoroughly mixed together and put up in dry powder form for sale.

There is also prepared another mixture consisting of paraffin wax and a vehicle therefor in which the wax will dissolve, such vehicle comprising turpentine or turpentine substitute, kerosene, gasoline, benzine, naphtha, or a mixture of any of the named liquids. Such solution, which may be, although is not necessarily, in the proportion of one pound of paraffin to one gallon of the solvent or vehicle, constitutes a waterproofing liquid, which, when mixed with the water paint powder formed into a relatively thin paste with water, constitutes a waterproof water paint suitable for application to surfaces to protect them, whether such surfaces be exterior or interior surfaces. When the waterproof water paint is used on the exterior of a building or other surface to be protected, whether such surface be wood, cement, stone or other such material, rain or moisture has no deleterious effect, for the water paint is water repellent similar to an oil paint and protects the wooden or other surface from the effects of moisture. Moreover, water does not wash off nor do weather conditions materially affect the coating, which therefore lasts indefinitely. Furthermore, the ingredients are of such nature and used in such proportions that the applied coating represents but a small fraction of the cost of oil paint of like qualities, both in protecting the surface to which it is applied and in lasting qualities.

In preparing the water paint a sufficient quantity of dry powder is taken and then water is added to the powder, placed in a suitable container, until a thick paste is produced, the material being stirred as the water is added until all lumps are worked out and the paint appears smooth. The water should not be very cold but preferably about room temperatures. Approximately one-half as much water by volume as powder will, by properly stirring, make a paste of the desired initial consistency. It is important that this paste be made perfectly smooth, otherwise satisfactory results are not obtainable by the use of my paint. When this is accomplished the mixture is thinned to about the consistency of cream and allowed to stand from twenty to thirty minutes with occasional stirring. If too thin more of the powder is added to bring the mixture to a thick paste, after which it is worked out smooth and again thinned, care being taken to avoid making it too thin and watery. A final consistency corresponding to cream or to good heavy oil paint is desirable.

Five pounds of the dry material makes about one gallon of the water paint and to this is added about one quart of the waterproofing material, or by measure this will mean from three to four parts of the powdered material to one part of the waterproofing solution, which is stirred in until the whole is thoroughly mixed. The waterproofing solution should be warmed in cool weather so that when pouring into the paste it has a temperature in the neighborhood of 70° F. This makes five quarts of mixed paint of thoroughly waterproof nature. The waterproofing material does not thin the paint to any material extent and does not affect its fireproof qualities after the paint is dry. At first, the solution does not mix with the water paint but by constant stirring an emulsion is formed which is semipermanent. This emulsion will retain its physical properties for any ordinary period of paint application; but it is best to stir this paint, like all others, occasionally, as it is being applied.

The waterproof water paint after it is applied sets or dries in about two hours, forming a practically waterproof non-absorbent coating which is also fireproof and suitable for either outside or inside use on wood, brick, stone, cement, and other porous surfaces, wall board, paper and other absorbent surfaces, galvanized and other metal, etc.

The adhesive properties of the paint are greatly improved making it adaptable to a greater variety of uses than other water paints, the paint is thoroughly washable, making it well adapted for interior work.

It is to be understood that the proportions hereinbefore given, while workable proportions, are by no means the only proportions of the ingredients, for it is well known in the art of painting that it is frequently advisable to vary the proportions to more perfectly adapt the paint to various uses.

What is claimed is:—

1. A process of making waterproof water paints which consists in first making a dry powder formed of casein, lime and a mineral filler, then adding water thereto and producing a smooth thick paste, adding more water and stirring until the mixture has the consistency of heavy cream, allowing the mixture to stand with occasional stirring, and then adding a waterproofing liquid consisting of a solution formed of two constituents, one of which is volatile.

2. A process of making waterproof water paints which consists in first making a dry powder formed of casein, lime and a mineral filler, then adding water thereto and producing a smooth thick paste, adding more water and producing a mixture of the consistency of heavy cream, allowing the mixture to stand with occasional stirring, and then adding a waterproofing liquid consisting of a solution of paraffine in a volatile solvent.

3. A process of making a waterproof water paint which consists in making a dry powder capable of use with water as a water paint, adding thereto sufficient water and producing a smooth thick paste, thinning the paste with more water and stirring until the mixture is homogeneous and of the consistency of heavy cream, allowing the mixture to stand for a period with occasional stirring, adding thereto a waterproofing liquid, and stirring the mixture of the paste and the liquid until a homogeneous emulsion is formed.

4. A process of making a waterproof water paint which consists in first making a dry powder capable when water is added thereto of use as a water paint, adding sufficient water to produce a smooth thick paste, stirring the paste until homogeneous, smooth and free from lumps, thinning the paste with more water and further stirring, letting the mixture stand for a short period of time with occasional stirring, adding thereto a waterproofing liquid in the substantial proportions of one part of the liquid to four parts of the paste, and stirring the mixture of the paste and liquid until a homogeneous emulsion is formed.

5. A process of making a waterproof water paint which consists of first making a dry powder containing casein and lime and capable when water is added thereto of use as a water paint, adding to the powder sufficient water to produce a heavy paste, stirring the paste until smooth and homogeneous, adding more water and stirring until the paste is thinned to the consistency of heavy cream, adding to four parts by volume of the mixture one part of a waterproofing liquid consisting of a solution of paraffine in a volatile solvent, and stirring the mixture of the paste and the waterproofing liquid until a semi-permanent homogeneous emulsion is formed.

In testimony, that I claim the foregoing as my own, I have hereto affixed my signature.

ARTHUR L. RICE.